(12) United States Patent
Takagi (10) Patent No.: US 9,288,398 B2
(45) Date of Patent: Mar. 15, 2016

(54) ACTION CONTROL DEVICE, ACTION CONTROL METHOD, IMAGING DEVICE, AND PROGRAM TO REDUCE FOCUS LAG

(71) Applicant: Sony Corporation, Tokyo (JP)

(72) Inventor: Yoshimitsu Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/350,601

(22) PCT Filed: Oct. 11, 2012

(86) PCT No.: PCT/JP2012/076349
§ 371 (c)(1),
(2) Date: Apr. 9, 2014

(87) PCT Pub. No.: WO2013/058165
PCT Pub. Date: Apr. 25, 2013

(65) Prior Publication Data
US 2014/0307159 A1    Oct. 16, 2014

(30) Foreign Application Priority Data

Oct. 18, 2011  (JP) ................. 2011-228539

(51) Int. Cl.
| | |
|---|---|
| *H04N 5/235* | (2006.01) |
| *H04N 5/225* | (2006.01) |
| *H04N 5/238* | (2006.01) |
| *H04N 5/232* | (2006.01) |
| *G02B 5/20* | (2006.01) |
| *G03B 11/00* | (2006.01) |
| *G03B 9/02* | (2006.01) |

(52) U.S. Cl.
CPC .......... *H04N 5/2352* (2013.01); *H04N 5/2254* (2013.01); *H04N 5/238* (2013.01); *H04N 5/23212* (2013.01); *G02B 5/205* (2013.01); *G03B 9/02* (2013.01); *G03B 11/00* (2013.01)

(58) Field of Classification Search
None
See application file for complete search history.

(56) References Cited

U.S. PATENT DOCUMENTS 6,529,253 B1 *  3/2003  Matsute .......................... 349/96
6,876,392 B1 *  4/2005  Uomori et al. ................ 348/348

(Continued)

FOREIGN PATENT DOCUMENTS

| JP | 06-105194 A | 4/1994 |
| JP | 10-327337 A | 12/1998 |

(Continued)

OTHER PUBLICATIONS

Japanese Office Action issued on Sep. 1, 2015 in patent application No. 2011228539.

*Primary Examiner* — Albert Cutler
(74) *Attorney, Agent, or Firm* — Sony Corporation (57) ABSTRACT

Provided is an action control device, including a variable-transmittance ND filter configured to have transmittance that varies according to an applied voltage, an applied voltage control unit configured to control a voltage to be applied to the variable-transmittance ND filter, and a diaphragm control unit configured to control illuminance through a diaphragm. At a time of monitoring, the illuminance is controlled such that the applied voltage control unit applies a substantially minimum voltage to the variable-transmittance ND filter, and the diaphragm control unit opens or closes the diaphragm, and at a time of imaging preparation or imaging, the illuminance is controlled such that the applied voltage control unit applies a certain applied voltage to the variable-transmittance ND filter in a state of the substantially minimum voltage, and controls transmittance, and the diaphragm control unit performs control such that the diaphragm enters a fully opened state or substantially fully opened state.

7 Claims, 5 Drawing Sheets

(56) References Cited

U.S. PATENT DOCUMENTS

2001/0017985 A1* 8/2001 Tsuboi ............... G02B 3/14
396/506
2004/0165879 A1* 8/2004 Sasaki et al. ............... 396/137

FOREIGN PATENT DOCUMENTS

| | | |
|---|---|---|
| JP | 11-344673 A | 12/1999 |
| JP | 2000-227618 A | 8/2000 |
| JP | 2006-135770 A | 5/2006 |

* cited by examiner

ACTION CONTROL DEVICE, ACTION CONTROL METHOD, IMAGING DEVICE, AND PROGRAM TO REDUCE FOCUS LAG

TECHNICAL FIELD

The present technology relates to an action control device, an action control method, an imaging device, and a program, and more particularly to an action control device, an action control method, an imaging device, and a program which are capable of reducing a focus lag.

BACKGROUND ART

In recent years, in the field of compact digital cameras, as the density of pixels of an image sensor increases, there are cases in which a sense of resolution deteriorates due to the influence of a small aperture blur.

In this regard, employment of a neutral density (ND) filter (variable-transmittance ND filter) that implements a desired transmittance without an aperture being changed by an applied voltage has been studied. Among ND filters, for example, a liquid crystal ND filter is used to reduce a drastic change in exposure and thus reduce an observer's fatigue by changing a transmittance when a light quantity drastically changes in an eyepiece image at the time of switching of an objective lens (see Patent Literature 1).

CITATION LIST

Patent Literature

Patent Literature 1: JP H11-344673A

SUMMARY

Technical Problem

However, in the case in which the exposure is controlled by changing the transmittance through the liquid crystal ND filter, when the temperature of the liquid crystal ND filter is low, a response speed of a liquid crystal decreases. For this reason, for example, at a timing at which a shutter button is pressed halfway so that auto focus (AF) is activated before imaging, control of the exposure by the liquid crystal ND filter is likely to be delayed, and thus a focus lag may increase.

It is desirable to provide a technique capable of reducing a focus lag that is caused by a decrease in a response speed of an ND filter that changes a transmittance according to an applied voltage.

Solution to Problem

According to a first embodiment of the present technology, there is provided an action control device, including a variable-transmittance neutral density (ND) filter configured to have transmittance that varies according to an applied voltage, an applied voltage control unit configured to control a voltage to be applied to the variable-transmittance ND filter, and a diaphragm control unit configured to control illuminance through a diaphragm. At a time of monitoring, the illuminance is controlled such that the applied voltage control unit applies a minimum voltage or a substantially minimum voltage to the variable-transmittance ND filter, and the diaphragm control unit opens or closes the diaphragm, and at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

The action control device may further include an imaging unit configured to image an image through the variable-transmittance ND filter, a transmittance calculating unit configured to calculate appropriate transmittance of the variable-transmittance ND filter based on illuminance of the image imaged by the imaging unit, and an applied voltage storage unit configured to store an applied voltage corresponding to transmittance of the variable-transmittance ND filter. At the time of imaging preparation or at the time of imaging, the applied voltage control unit performs control such that, among applied voltages stored in the applied voltage storage unit, an applied voltage corresponding to the appropriate transmittance calculated by the transmittance calculating unit is applied to the variable-transmittance ND filter.

The variable-transmittance ND filter may be a liquid crystal ND filter.

The transmittance of the variable-transmittance ND filter may increase or decrease as the applied voltage increases.

According to the first embodiment of the present technology, there is provided an action control method of an action control device including a variable-transmittance neutral density (ND) filter having transmittance that varies according to an applied voltage, the method including performing an applied voltage control process of controlling a voltage to be applied to the variable-transmittance ND filter, and performing a diaphragm control process of controlling illuminance through a diaphragm. At a time of monitoring, the illuminance is controlled such that a minimum voltage or a substantially minimum voltage is applied to the variable-transmittance ND filter in the applied voltage control process, and the diaphragm is opened or closed in the diaphragm control process, and at a time of imaging preparation or at a time of imaging, the illuminance is controlled such that a certain applied voltage is applied to the variable-transmittance ND filter in a state of the minimum voltage or the substantially minimum voltage and transmittance is controlled in the applied voltage control process, and the diaphragm control unit performs control such that the diaphragm enters a fully opened state or a substantially fully opened state.

According to the first embodiment of the present technology, there is provided a program causing a computer, which controls an action control device including a variable-transmittance neutral density (ND) filter having transmittance that varies according to an applied voltage, to function as: an applied voltage control unit configured to control a voltage to be applied to the variable-transmittance ND filter, and a diaphragm control unit configured to control illuminance through a diaphragm. At a time of monitoring, the illuminance is controlled such that the applied voltage control unit applies a minimum voltage or a substantially minimum voltage to the variable-transmittance ND filter, and the diaphragm control unit opens or closes the diaphragm, and at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

According to a second embodiment of the present technology, there is provided an imaging device, including a variable-transmittance neutral density (ND) filter configured to have transmittance that varies according to an applied voltage, an applied voltage control unit configured to control a voltage to be applied to the variable-transmittance ND filter, and a diaphragm control unit configured to control illuminance through a diaphragm. At a time of monitoring, the illuminance is controlled such that the applied voltage control unit applies a minimum voltage or a substantially minimum voltage to the variable-transmittance ND filter, and the diaphragm control unit opens or closes the diaphragm, and at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

An imaging device according to a second aspect of the present technology includes a light quantity calculating unit configured to calculate a light quantity suitable for imaging, a variable-transmittance neutral density (ND) filter having transmittance that varies according to an applied voltage, an applied voltage control unit configured to control a voltage to be applied to the variable-transmittance ND filter, and a diaphragm control unit configured to control a diaphragm configured to change a light quantity, wherein, at the time of monitoring, the applied voltage control unit applies a minimum voltage or an approximately minimum voltage to the variable-transmittance ND filter, and the diaphragm control unit opens or closes the diaphragm in accordance with an appropriate light quantity calculated by the light quantity calculating unit, and at the time of imaging preparation or at the time of imaging, the illuminance is controlled such that the applied voltage control unit applies a certain applied voltage to the variable-transmittance ND filter in a state of the minimum voltage or the approximately minimum voltage, and controls transmittance, and the diaphragm control unit performs control such that the diaphragm enters a fully opened state or an approximately fully opened state.

In the first and second aspects of the present technology, the voltage to be applied to the variable-transmittance ND filter having transmittance that varies according to an applied voltage is controlled, illuminance is controlled by the diaphragm, at the time of monitoring, the illuminance is controlled such that a minimum voltage or an approximately minimum voltage is applied to the variable-transmittance ND filter, and the diaphragm is opened or closed, and at the time of imaging preparation or at the time of imaging, the illuminance is controlled such that transmittance is controlled by applying a certain applied voltage to the variable-transmittance ND filter in a state of the minimum voltage or the approximately minimum voltage, and the diaphragm is controlled to enter a fully opened state or an approximately fully opened state.

The action control device or the imaging device according to the present technology may be an independent device or may be a block that performs an action control process or an imaging process.

Advantageous Effects of Invention

According to the present technology, it is possible to reduce a focus lag.

DESCRIPTION OF EMBODIMENTS

[Exemplary Configuration of Imaging Device According to First Embodiment of Present Technology]

Figure 1:
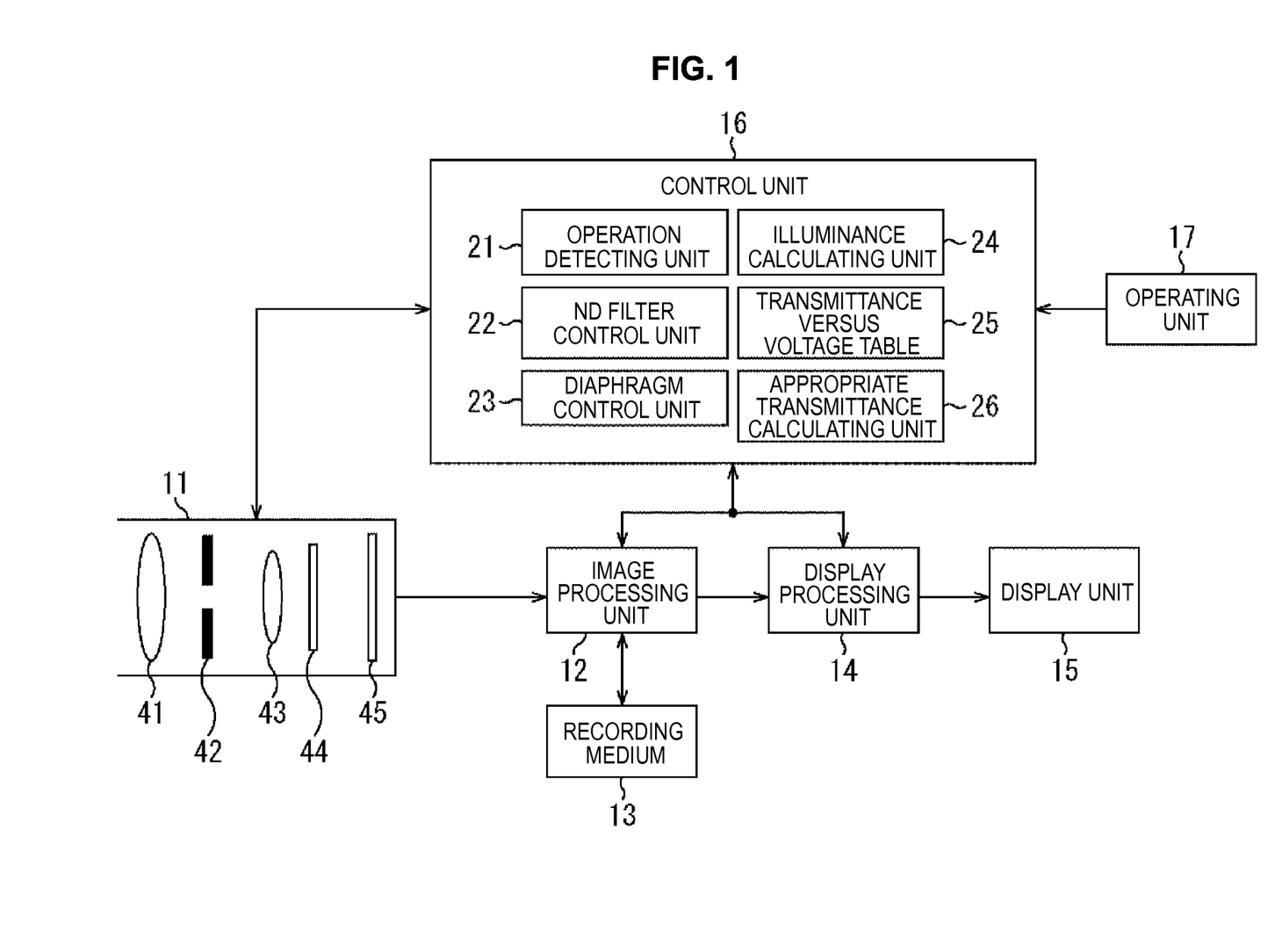
FIG. 1 is a diagram illustrating an exemplary configuration of an imaging device according to a first embodiment of the present technology.

FIG. 1 is a diagram for describing an exemplary configuration of an imaging device according to an embodiment of the present technology. The imaging device of FIG. 1 includes a lens barrel 11, an image processing unit 12, a recording medium 13, a display processing unit 14, a display unit 15, a control unit 16, and an operating unit 17, and causes an image imaged by an imaging element 45 installed in the lens barrel 11 to be recorded in the recording medium 13 or to be displayed on the display unit 15. More specifically, when a half push operation representing imaging preparation is performed on the operating unit 17 including a shutter button or the like, the control unit 16 controls the lens barrel 11 such that a focus is controlled. Then, when a full push operation representing an imaging instruction is performed on the operating unit 17 including the shutter button or the like, the control unit 16 controls the lens barrel 11 such that an image is imaged. Then, the lens barrel 11 supplies the imaged image to the image processing unit 12 as an image signal. The image processing unit 12 performs certain processing on the image signal such as a process of compressing the image signal in a certain data format, and records the resultant data in the recording medium 13. Alternatively, the image processing unit 12 performs certain processing on the imaged image signal, supplies the resultant data to the display processing unit 14, and causes the data to be displayed on the display unit 15 including a liquid crystal display (LCD) or the like.

More specifically, the lens barrel 11 includes a zoom lens 41, a diaphragm 42, a focus lens 43, a liquid crystal ND filter 44, and the imaging element 45, and causes an image of a subject (not shown) to be formed in the imaging element 45 through the zoom lens 41, and the focus lens 43. Then, the imaging element 45 images the formed subject image, and outputs the imaged subject image as an image signal. Further, the control unit 16 controls the diaphragm 42 such that the diaphragm 42 adjusts a light quantity (illuminance) incident on the lens barrel 11. The liquid crystal ND filter (liquid crystal variable-transmittance ND filter) 44 adjusts a light quantity incident (illuminance) on the imaging element 45 by changing the transmittance by a voltage supplied to the control unit 16. The diaphragm 42 and the liquid crystal ND filter 44 are basically the same in purpose. However, the liquid crystal ND filter 44 can adjust a light quantity (illuminance) by uniformly changing the transmittance in the lens barrel 11, but it is difficult for the liquid crystal ND filter 44 to cope with a drastic change since the liquid crystal ND filter 44 changes the transmittance by the liquid crystal. Meanwhile, since the diaphragm 42 adjusts a light quantity by opening and closing an aperture portion, it is difficult to adjust a light quantity uniformly, but it is possible to adjust a light quantity at a high speed. The imaging element 45 includes, for example, a charge coupled device (CCD), a complementary metal oxide semiconductor (CMOS), or the like, is controlled by the control unit 16 to image an image, and outputs the imaged image as an image signal.

The control unit 16 is configured with a micro computer or the like, and controls an operation of the imaging device in general. More specifically, the control unit 16 includes an operation detecting unit 21, an ND filter control unit 22, a diaphragm control unit 23, an illuminance calculating unit 24, a transmittance versus voltage table 25, and an appropriate transmittance calculating unit 26. The operation detecting unit 21 detects a half push operation representing an imaging preparation instruction or a full push operation representing an imaging instruction based on an operation signal from the operating unit 17, and outputs a corresponding detection signal. The ND filter control unit 22 controls the transmittance of the liquid crystal ND filter 44 by controlling a voltage to be applied to the liquid crystal ND filter 44. The transmittance versus voltage table 25 is a table representing a relation between the transmittance of the liquid crystal ND filter 44 and an applied voltage. Thus, when the liquid crystal ND filter 44 is set to certain transmittance, the ND filter control unit 22 reads an applied voltage corresponding to the certain transmittance with reference to the transmittance versus voltage table 25, and controls the liquid crystal ND filter 44 by the read applied voltage. Here, since a necessary applied voltage only has to be obtained from transmittance, a configuration capable of calculating an applied voltage through a function capable of calculating an applied voltage from transmittance may be used instead of the transmittance versus voltage table 25.

The illuminance calculating unit 24 calculates illuminance incident on the imaging element 45 based on the image signal imaged by the imaging element 45 of the lens barrel 11, and supplies the calculated illuminance to the diaphragm control unit 23 and the appropriate transmittance calculating unit 26. The diaphragm control unit 23 controls the size of the opening portion of the diaphragm 42 based on the illuminance supplied from the illuminance calculating unit 24 such that brightness incident on the imaging element 45 is optimal.

The appropriate transmittance calculating unit 26 calculates transmittance of the liquid crystal ND filter 44 at which illuminance incident on the imaging element 45 is optimal based on the illuminance supplied from the illuminance calculating unit 24, and supplies the calculated transmittance of the liquid crystal ND filter 44 to the ND filter control unit 22. The ND filter control unit 22 reads a voltage to be applied to the liquid crystal ND filter 44 based on the supplied transmittance with reference to the transmittance versus voltage table 25, and applies the read voltage to the liquid crystal ND filter 44.

Meanwhile, the imaging device of FIG. 1 is configured to be capable of controlling brightness (illuminance or a light quantity) of both the diaphragm 42 and the liquid crystal ND filter 44 based on the illuminance calculated by the illuminance calculating unit 24 as described above. Further, the imaging device of FIG. 1 performs a monitoring display until the operating unit 17 is pushed halfway or pushed fully so that an imaging preparation instruction or an imaging instruction is given. In other words, the image signals imaged by the imaging element 45 are continuously supplied to the image processing unit 12, subjected to certain processing, then supplied to the display processing unit 14, and sequentially displayed on the display unit 15 as a monitoring image. Thus, the user of the imaging device can recognize an image that can be currently imaged. Here, for the monitoring display, an image imaged by the imaging element 45 is displayed in real time, and thus it is necessary to perform control of appropriate brightness based on illuminance in real time. Both the diaphragm 42 and the liquid crystal ND filter 44 can control brightness, but since the diaphragm 42 of the mechanical type is high in the response speed and suitable for the monitoring display that has to be imaged in real time, in this case, brightness is controlled by the diaphragm 42.

Figure 2:
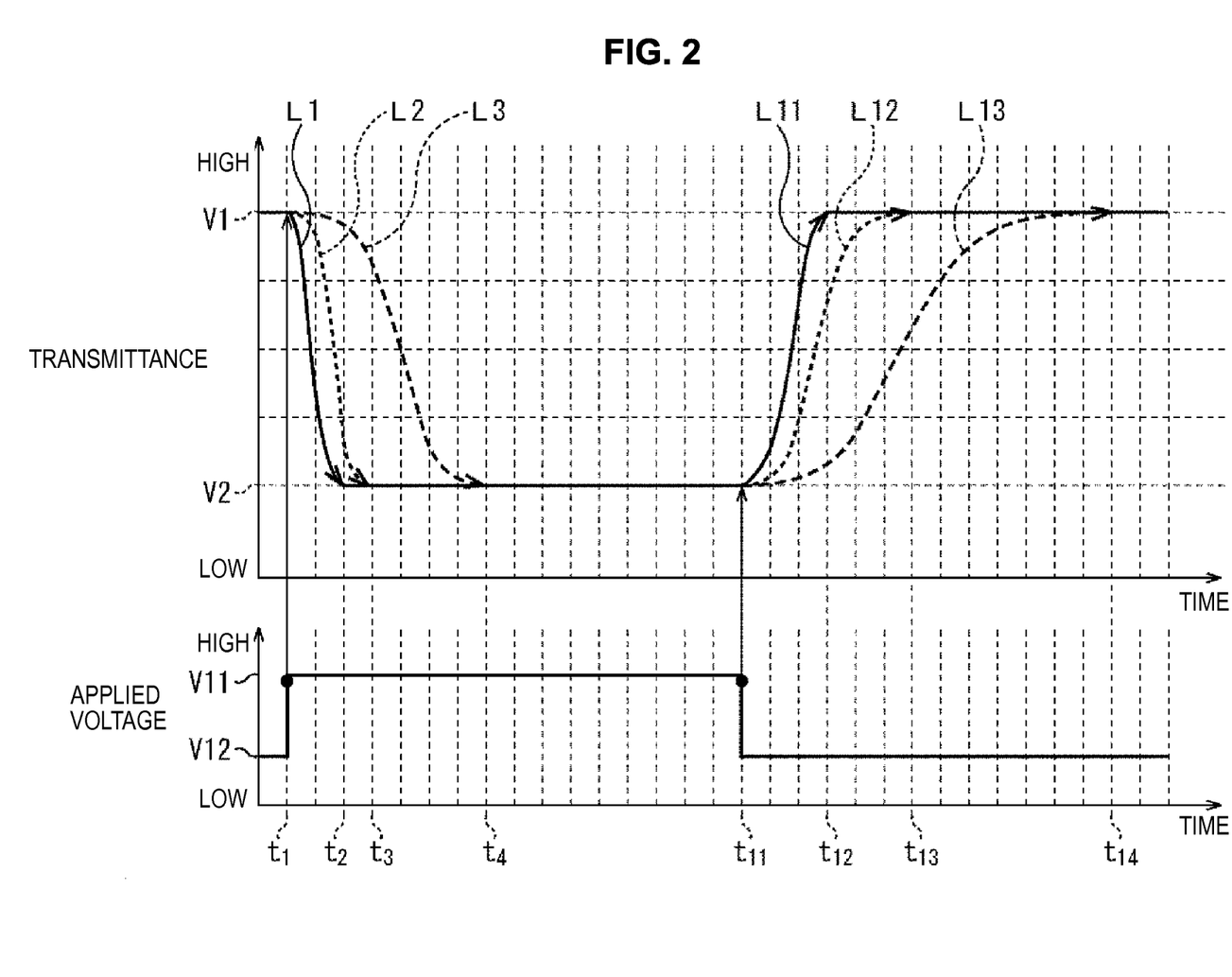
FIG. 2 is a diagram for describing transmittance characteristics according to an elapsed time from a timing at which a voltage is applied to a liquid crystal ND filter.

Meanwhile, when the liquid crystal ND filter 44 controls transmittance, the transmittance does not reach a target level unless a certain elapsed time elapses from a timing at which an applied voltage corresponding to the desired transmittance is applied. FIG. 2 illustrates characteristics of the liquid crystal ND filter 44.

FIG. 2 illustrates a relation and an elapsed time after an applied voltage is applied to the liquid crystal ND filter 44 and transmittance for each temperature of the liquid crystal ND filter 44. In other words, for example, when an applied voltage is changed from a voltage V12 to a voltage V11 (>V12) and then applied as illustrated by a waveform of an applied voltage at a time t1 in the lower part of FIG. 2, if the temperature of the liquid crystal ND filter 44 is relatively high, that is, T1, an elapsed time until transmittance reaches from transmittance V1 to transmittance V2 of the target is a period of time (t2−t1) as illustrated by a waveform L1 in the upper part of FIG. 2. However, when the temperature of the liquid crystal ND filter 44 is a temperature T2 (<T1) lower than the temperature T1, an elapsed time until the transmittance reaches from the transmittance V1 to the transmittance V2 of the target is a period of time (t3−t1) (>(t2−t1)) as illustrated by a waveform L2 in the upper part of FIG. 2. Further, when the temperature of the liquid crystal ND filter 44 is a temperature T3 (<T2<T1) lower than the temperature T2, an elapsed time until the transmittance reaches from the transmittance V1 to the transmittance V2 of the target is a period of time (t4−t1) (>(t3−t1)>(t2−t1)) as illustrated by a waveform L3 in the upper part of FIG. 2. In other words, the liquid crystal configuring the liquid crystal ND filter 44 decreases in the response speed more or less due to influence of viscosity of the liquid crystal until the transmittance reaches the target level after the applied voltage is applied. Further, when the temperature is lowered, the viscosity of the liquid crystal increases, and the response speed therefore decreases, and thus when the applied voltage is changed to increase from the voltage V12 to the voltage V11, an elapsed time until the transmittance reaches the target level increases.

On the other hand, for example, when an applied voltage is changed from a voltage V11 to a voltage V12 (<V11) and then applied as illustrated by a waveform of an applied voltage at a time t11 in the lower part of FIG. 2, if the temperature of the liquid crystal ND filter 44 is relatively high, that is, T1, an elapsed time until a transmittance reaches from the transmittance V2 to the transmittance V1 of the target is a period of time (t12−t11) as illustrated by a waveform L11 in the upper part of FIG. 2. However, when the temperature of the liquid crystal ND filter 44 is a temperature T2 (<T1) lower than the temperature T1, an elapsed time until the transmittance reaches from the transmittance V2 to the transmittance V1 of the target is a period of time (t13−t11) (>(t12−t11)) as illustrated by a waveform L12 in the upper part of FIG. 2. Further, when the temperature of the liquid crystal ND filter 44 is a temperature T3 (<T2<T1) lower than the temperature T2, an elapsed time until the transmittance reaches from the transmittance V2 to the transmittance V1 of the target is a period of time (t14−t11) (>(t13−t11)>(t12−t11)) as illustrated by a waveform L13 in the upper part of FIG. 2. In other words, the liquid crystal configuring the liquid crystal ND filter 44 increases in viscosity and thus decreases in the response speed as the temperature decreases, and so when the applied voltage is changed to decrease from the voltage V12 to the voltage V11, an elapsed time until the transmittance reaches a target level increases. In addition, when the applied voltage decreases, the response speed decreases more than when the applied voltage increases. Accordingly, an elapsed time until the transmittance reaches a target level increases. Here, FIG. 2 illustrates characteristics when the liquid crystal ND filter 44 is of a negative type in which the transmittance decreases as the applied voltage increases, but even when the liquid crystal ND filter 44 is of a positive type in which the transmittance increases as the applied voltage increases, the response speed is known to increase as the applied voltage increases.

The liquid crystal ND filter 44 has this operation characteristic but is known to be capable of controlling brightness uniformly on the imaging element 45 compared to the diaphragm 42 and can reduce, for example, a lack of a sense of resolution of an image. In this regard, the imaging device of FIG. 1 controls brightness through the diaphragm 42 unless the operating unit 17 including a shutter or the like is pushed halfway or pushed fully, and controls brightness by controlling the diaphragm 42 that can follow a change in brightness in real time, that is, at some degree of a response speed. Meanwhile, when the operating unit 17 including a shutter or the like is pushed halfway or pushed fully, the imaging device of FIG. 1 controls brightness through the liquid crystal ND filter 44, and controls brightness in a state in which a sense of resolution is high.

Further, as illustrated by the waveforms L1 to L3 and the waveforms L11 to L13 of FIG. 2, the liquid crystal ND filter 44 is faster in the response speed when the applied voltage increases than when the applied voltage decreases. In this regard, the imaging device of FIG. 1 controls brightness through the diaphragm 42 that is low in a sense of resolution and high in a following property when the monitoring image is displayed. Further, when the operating unit 17 is pushed halfway or pushed fully so that an imaging preparation instruction or an imaging instruction is given, the imaging device of FIG. 1 uses the liquid crystal ND filter 44 that is low in the following property but high in a sense of resolution for control of brightness in a state in which the following property is relatively high. As a result, it is possible to suppress a focus lag.

[Action Control Process Performed by Imaging Device of FIG. 1]

Figure 3:
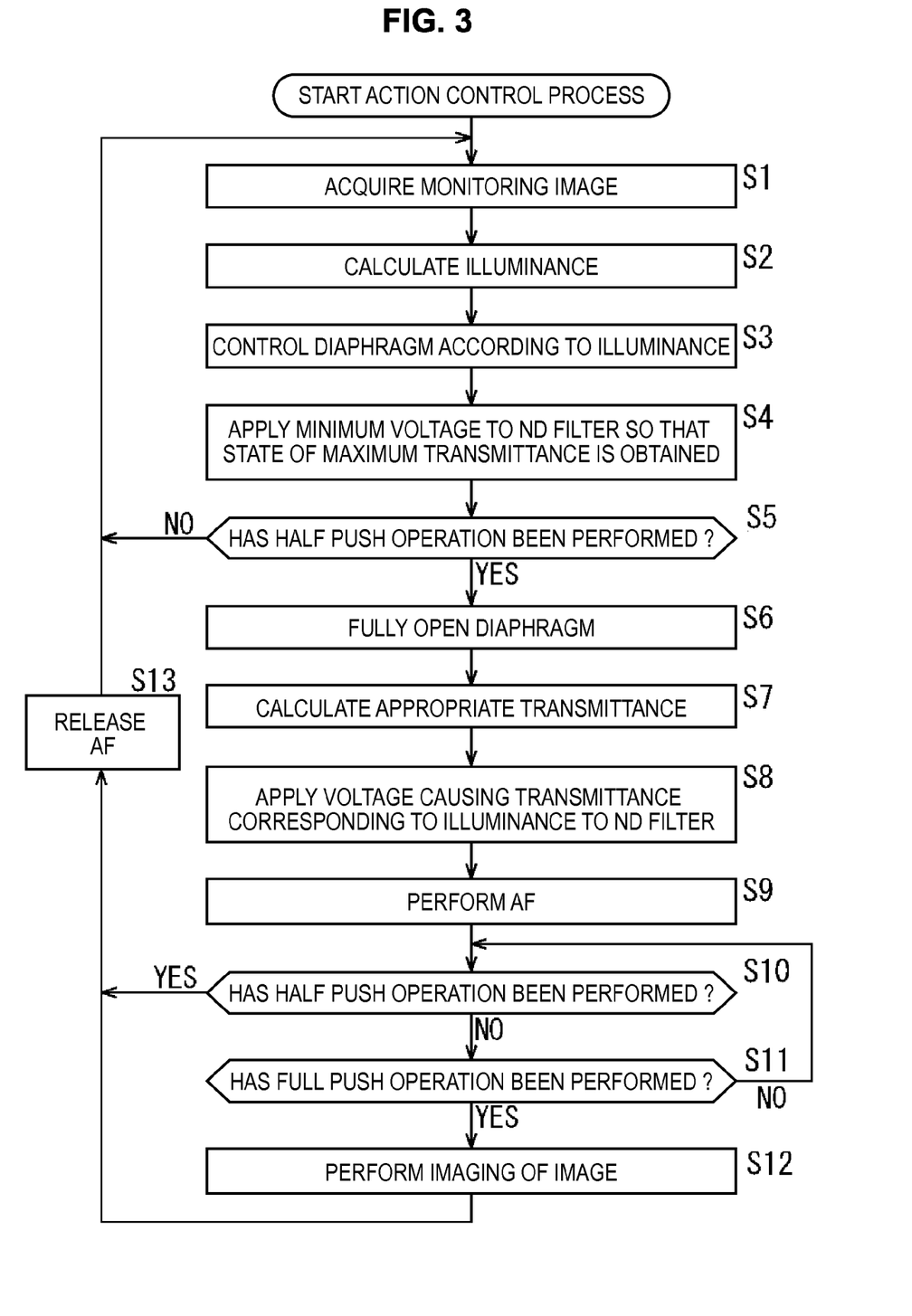
FIG. 3 is a flowchart for describing an action control process performed by the imaging device of FIG. 1.

Next, an action control process performed when the imaging device of FIG. 1 performs imaging will be described with reference to a flowchart of FIG. 3.

In step S1, the control unit 16 controls the imaging element 45 of the lens barrel 11 such that the imaging element 46 images a monitoring image and outputs a monitoring image signal to the image processing unit 12. The image processing unit 12 supplies the monitoring image to the control unit 16 and the display control unit 14. At this time, the display control unit 14 performs certain processing on the image signal of the monitoring image, and causes the resultant data to be displayed on the display unit 15.

In step S2, the control unit 16 controls the illuminance calculating unit 24 such that the illuminance calculating unit 24 calculates illuminance necessary for imaging from the image which has been imaged by the imaging element 45 of the lens barrel 11 and supplied from the image processing unit 12, and supplies the calculated illuminance to the diaphragm control unit 23 and the appropriate transmittance calculating unit 26.

In step S3, the diaphragm control unit 23 appropriately controls an opening degree of the opening portion of the diaphragm 42 based on the illuminance supplied from the illuminance calculating unit 24 so that the imaging element 45 can image an image at appropriate brightness.

In step S4, the ND filter control unit 22 applies a minimum voltage that can be applied to the liquid crystal ND filter 44. In this case, since the ND filter control unit 22 is a negative type in which transmittance increases as an applied voltage increases, the transmittance becomes the transmittance V1 of the highest state as illustrated in the central part of FIG. 4, and in this state, control of brightness is not substantially performed.

In step S5, the operation detecting unit 21 determines whether the half push operation representing the imaging preparation state has been performed by the operating unit 17. When it is determined in step S5 that the half push operation has not been performed, the process returns to step S1. In other words, the process of steps S1 to S5 is repeated until the half push operation is performed. As a result, the monitoring image is continuously imaged, and the liquid crystal ND filter 44 has the highest transmittance, and thus in this state, control of brightness is not substantially performed. Meanwhile, the diaphragm 42 is constantly continuously controlled so that the opening portion has the opening degree at which an appropriate light quantity is obtained. In this period, the user views an image displayed on the display unit 15 and can recognize the position imaged by the imaging element 45 of the lens barrel 11.

Figure 4:
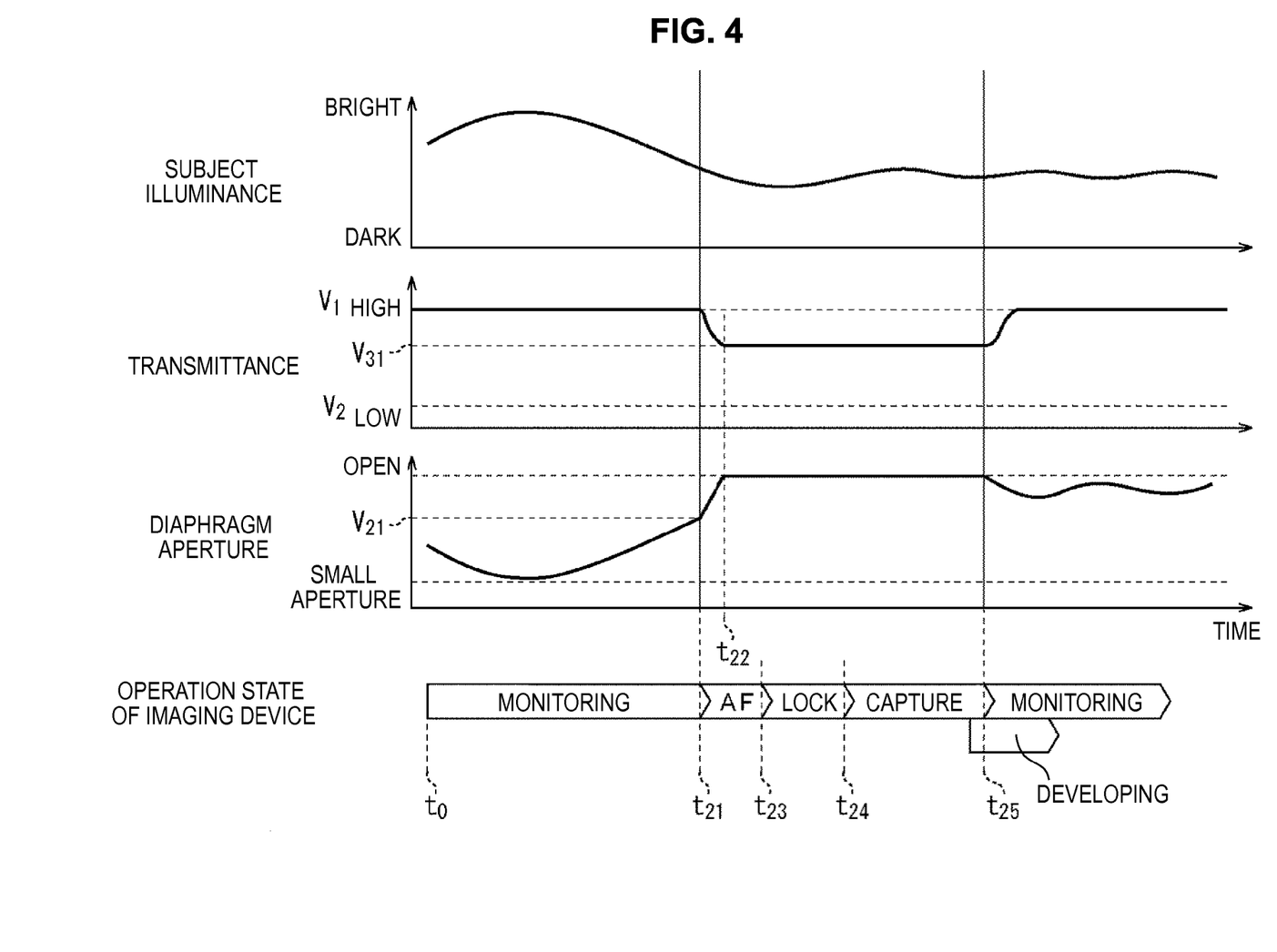
FIG. 4 is a diagram for describing an action control process performed by the imaging device of FIG. 1.

In other words, when monitoring starts from a time t0 of FIG. 4, at times t0 to t21, subject illuminance in the upper part of FIG. 4 has a waveform that steadily increases from the time t0, has a peak at the middle point between the times t0 and t21, then decreases until the time t21 to return to an original value. Meanwhile, as illustrated in the lower part of FIG. 4, the opening degree of the diaphragm 42, that is, the aperture of the opening portion of the diaphragm 42, follows a change in illuminance almost in real time. As the illuminance increases from the time t0, the aperture steadily decreases, and when the illuminance has a peak at the middle point between the times t0 and t21, the opening degree is smallest, and thus light is squeezed. Thereafter, as illustrated at around the time t21, when the illuminance decreases, the aperture of the diaphragm 42 increases, that is, the diaphragm 42 is opened with the high opening degree, and thus light is introduced.

At this time, as illustrated in the central part of FIG. 4, an applied voltage to be applied to the liquid crystal ND filter 44 has the lowest level, and thus the transmittance becomes V1 which is the highest value. Thus, until it is determined in step S5 that the half push operation has been performed by the operating unit 17, that is, while the process of steps S1 to S5 is repeated, the liquid crystal ND filter 44 is in a substantially inactive state, and the monitoring state is continued.

Then, when it is determined in step S5 that the half push operation has been performed by pushing the operating unit 17 halfway and a corresponding operation signal as been generated as illustrated at a time t11 in FIG. 4, the process proceeds to step S6.

In step S6, the control unit 16 controls the diaphragm control unit 23 such the diaphragm 42 is fully opened. Through this operation, the diaphragm 42 enters a substantially inactive state.

In step S7, the control unit 16 controls the appropriate transmittance calculating unit 26 such that the appropriate transmittance calculating unit 26 calculates appropriate transmittance of the liquid crystal ND filter 44 based on the illuminance supplied from the illuminance calculating unit 24.

In step S8, the control unit 16 controls the ND filter control unit 22 such that the liquid crystal ND filter 44 has the appropriate transmittance calculated by the appropriate transmittance calculating unit 26. More specifically, the ND filter control unit 22 reads information of a corresponding applied voltage with reference to the transmittance versus voltage table 25 based on information of the appropriate transmittance calculated by the appropriate transmittance calculating unit 26. Further, the ND filter control unit 22 applies the read applied voltage to the liquid crystal ND filter 44, and controls the liquid crystal ND filter 44 such that the liquid crystal ND filter 44 has the appropriate transmittance.

In step S9, the control unit 16 controls the focus lens 43 such that the focus lens 43 performs an AF operation so that a state in which the subject image is formed in the imaging element 45 is set as illustrated at the times t21 to t23 of FIG. 4 through a series of processes described above.

In other words, after the half push operation is performed, control of brightness is performed by the liquid crystal ND filter 44 rather than the diaphragm 42. As a result, for example, as illustrated in the lower part of FIG. 4, the opening operation of the diaphragm 42 starts at the time t21 through the process of step S6 and is completed at the time t22, so that the diaphragm 42 is fully opened. Meanwhile, at the time t21, through the process of steps S7 and S8, the applied voltage corresponding to the appropriate transmittance V31 based on the illuminance is applied to the liquid crystal ND filter 44 through the ND filter control unit 22, and thus at the time t22, the transmittance of the liquid crystal ND filter 44 reaches V31, and after the time t23, the transmittance V31 and the auto focus are locked.

Here, as illustrated at the times t21 and t22 of FIG. 4, the diaphragm 42 can instantly switch from the state of the aperture V21 to the fully opened state, but is steadily opened in view of the response characteristics of the liquid crystal ND filter 44. This is because, when the half push operation is detected and thus an entity controlling illuminance switches from the diaphragm 42 to the liquid crystal ND filter 44, the diaphragm 42 controls illuminance in a support manner according to transmittance while the transmittance of the liquid crystal ND filter 44 changes up to the target transmittance. As a result, even when an entity controlling illuminance switches from the diaphragm 42 to the liquid crystal ND filter 44, control is performed such that illuminance received by the imaging element 45 is uniform.

In step S10, the operation detecting unit 21 determines whether the half push operation has been released based on the operation signal of the operating unit 17. For example, when it is determined in step S10 that the half push operation has been released, the process proceeds to step S13, the auto focus is released, and then the process returns to step S1. In other words, in this case, the process returns to the monitoring state.

However, when it is determined in step S10 that the half push operation has not been released, in step S11, the operation detecting unit 21 determines whether the full push operation representing the imaging instruction has been performed based on the operation signal of the operating unit 17, and when it is determined that the full push operation has not been performed, the process returns to step S10. In other words, when the state in which the half push operation has been performed is continued, the process of steps S10 and S11 is repeated. Then, when the full push operation is detected in step S11, for example, as illustrated at the time t24 of FIG. 4, the process proceeds to step S12.

In step S12, the control unit 16 controls the imaging element 45 such that an image is imaged, and then the process proceeds to step S13. Through this process, for example, as illustrated at the times t24 and t25 of FIG. 4, the imaging element 45 images (captures) an image, and supplies the imaged image to the image processing unit 12 as an image signal. Thereafter, as illustrated after the time t25, the process returns to the monitoring process by the process of steps S1 to S5.

Through the above process, when monitoring is performed, brightness is controlled by the diaphragm 42 that is low in a sense of resolution but excellent in the following property, and thus it is possible to display a monitoring image while appropriately controlling brightness in real time. In this case, the monitoring image is a moving image and is thus low in a sense of resolution but can be displayed without giving an uncomfortable feeling when viewed. Further, when an imaging preparation instruction or an imaging instruction is given by the half push operation or the full push operation, the diaphragm 42 is fully opened (or opened in a state close to the fully opened state (approximately fully opened)), and brightness is controlled by the liquid crystal ND filter 44. Further, when monitoring is performed, an applied voltage applied to the liquid crystal ND filter 44 is set to a minimum voltage (or a voltage close to the minimum voltage (approximately minimum voltage)). For this reason, even when a voltage is suddenly applied to the liquid crystal ND filter 44 by the half push operation or the full push operation, since the liquid crystal ND filter 44 shows the most excellent response speed when a voltage is applied to increase as described above with reference to FIG. 2, when switching from the monitoring state is performed, it is possible to switch an entity controlling brightness to the liquid crystal ND filter 44 at a relatively high speed. In the above description, "fully opened" means not only a state in which the diaphragm is fully opened but also a state in which the diaphragm is approximately fully opened. Further, "minimum voltage" means not only a minimum voltage but also an approximately minimum voltage.

The above description has been made in connection with the example in which the liquid crystal ND filter is used as an example of the ND filter, but ND filters of various structures may be used as long as the ND filter changes a transmittance according to an applied voltage. Further, the liquid crystal ND filter of the negative type has been described as an example of the ND filter, but the liquid crystal ND filter of the positive type may be used.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 5:
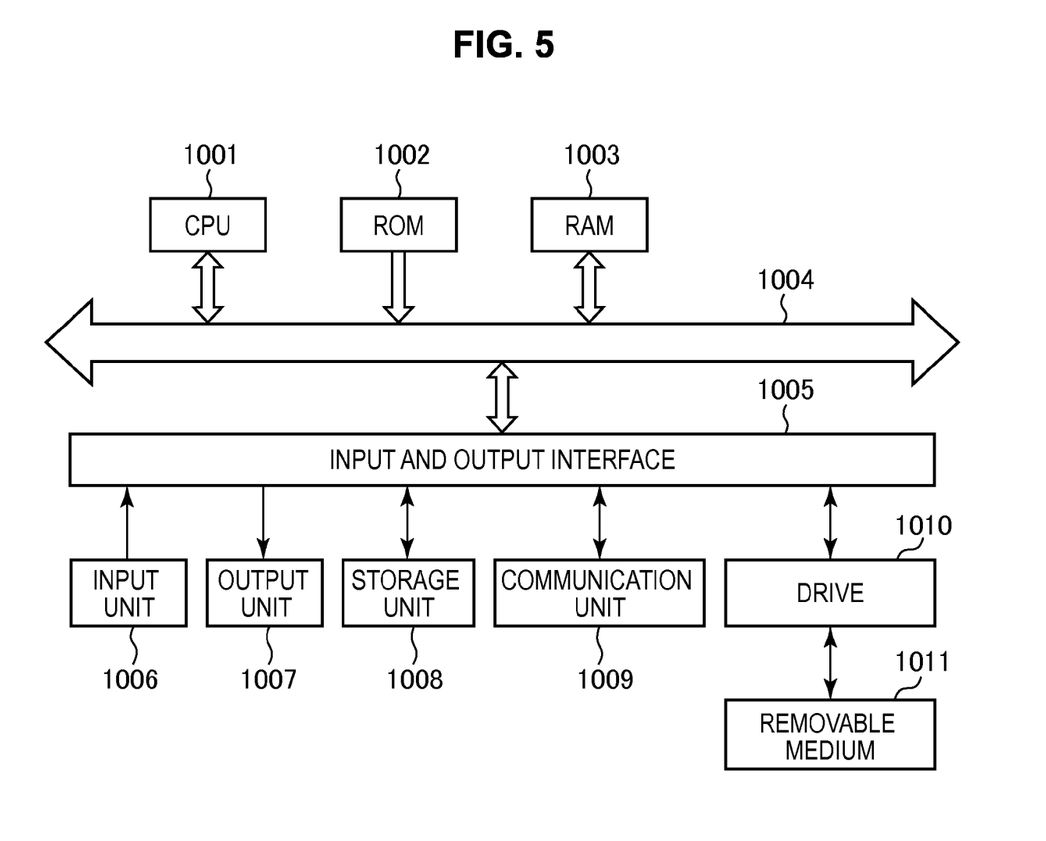
FIG. 5 is a diagram for describing an exemplary configuration of a general-purpose personal computer.

FIG. 5 is a block diagram showing a hardware configuration example of a computer that performs the above-described series of processing using a program.

In the computer, a central processing unit (CPU) 1001, a read only memory (ROM) 1002 and a random access memory (RAM) 1003 are mutually connected by a bus 1004.

An input/output interface 1005 is also connected to the bus 1004. An input unit 1006, an output unit 1007, a storage unit 1008, a communication unit 1009, and a drive 1010 are connected to the input/output interface 1005.

The input unit 1006 is configured from a keyboard, a mouse, a microphone or the like. The output unit 1007 is configured from a display, a speaker or the like. The storage unit 1008 is configured from a hard disk, a non-volatile memory or the like. The communication unit 1009 is configured from a network interface or the like. The drive 1010 drives a removable medium 1011 such as a magnetic disk, an optical disk, a magneto-optical disk, a semiconductor memory or the like.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

Then, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

Further, each step described by the above mentioned flow charts can be executed by one apparatus or by allocating a plurality of apparatuses.

Additionally, the present technology may also be configured as below.

(1)

An action control device, including:

a variable-transmittance neutral density (ND) filter configured to have transmittance that varies according to an applied voltage;

an applied voltage control unit configured to control a voltage to be applied to the variable-transmittance ND filter; and a diaphragm control unit configured to control illuminance through a diaphragm, wherein, at a time of monitoring, the illuminance is controlled such that the applied voltage control unit applies a minimum voltage or a substantially minimum voltage to the variable-transmittance ND filter, and the diaphragm control unit opens or closes the diaphragm, and wherein, at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

(2)

The action control device according to (1), further including:

an imaging unit configured to image an image through the variable-transmittance ND filter;

a transmittance calculating unit configured to calculate appropriate transmittance of the variable-transmittance ND filter based on illuminance of the image imaged by the imaging unit; and an applied voltage storage unit configured to store an applied voltage corresponding to transmittance of the variable-transmittance ND filter, wherein, at the time of imaging preparation or at the time of imaging, the applied voltage control unit performs control such that, among applied voltages stored in the applied voltage storage unit, an applied voltage corresponding to the appropriate transmittance calculated by the transmittance calculating unit is applied to the variable-transmittance ND filter.

(3)

The action control device according to (1) or (2), wherein the variable-transmittance ND filter is a liquid crystal ND filter.

(4)

The action control device according to any one of (1) to (3), wherein the transmittance of the variable-transmittance ND filter increases or decreases as the applied voltage increases.

(5)

An action control method of an action control device including a variable-transmittance neutral density (ND) filter having transmittance that varies according to an applied voltage, the method including:

performing an applied voltage control process of controlling a voltage to be applied to the variable-transmittance ND filter; and performing a diaphragm control process of controlling illuminance through a diaphragm, wherein, at a time of monitoring, the illuminance is controlled such that a minimum voltage or a substantially minimum voltage is applied to the variable-transmittance ND filter in the applied voltage control process, and the diaphragm is opened or closed in the diaphragm control process, and wherein, at a time of imaging preparation or at a time of imaging, the illuminance is controlled such that a certain applied voltage is applied to the variable-transmittance ND filter in a state of the minimum voltage or the substantially minimum voltage and transmittance is controlled in the applied voltage control process, and the diaphragm control unit performs control such that the diaphragm enters a fully opened state or a substantially fully opened state.

(6)

A program causing a computer, which controls an action control device including a variable-transmittance neutral density (ND) filter having transmittance that varies according to an applied voltage, to function as:

an applied voltage control unit configured to control a voltage to be applied to the variable-transmittance ND filter; and a diaphragm control unit configured to control illuminance through a diaphragm, wherein, at a time of monitoring, the illuminance is controlled such that the applied voltage control unit applies a minimum voltage or a substantially minimum voltage to the variable-transmittance ND filter, and the diaphragm control unit opens or closes the diaphragm, and wherein, at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

(7)

An imaging device, including:

a variable-transmittance neutral density (ND) filter configured to have transmittance that varies according to an applied voltage;

an applied voltage control unit configured to control a voltage to be applied to the variable-transmittance ND filter; and a diaphragm control unit configured to control illuminance through a diaphragm, wherein, at a time of monitoring, the illuminance is controlled such that the applied voltage control unit applies a minimum voltage or a substantially minimum voltage to the variable-transmittance ND filter, and the diaphragm control unit opens or closes the diaphragm, and wherein, at a time of imaging preparation or at a time of imaging, the illuminance is controlled such that the applied voltage control unit applies a certain applied voltage to the variable-transmittance ND filter in a state of the minimum voltage or the substantially minimum voltage, and controls transmittance, and the diaphragm control unit performs control such that the diaphragm enters a fully opened state or a substantially fully opened state.

REFERENCE SIGNS LIST 11 lens barrel
12 image processing unit
13 recording medium
14 display processing unit
15 display unit
16 control unit
17 operating unit
21 operation detecting unit
22 ND filter control unit
23 diaphragm control unit
24 illuminance calculating unit
25 transmittance versus voltage table
26 appropriate transmittance calculating unit
41 zoom lens
42 diaphragm
43 focus lens
44 liquid crystal ND filter
45 imaging element

The invention claimed is:

1. An action control device, comprising:
   a variable-transmittance neutral density (ND) filter configured to have transmittance that varies according to an applied voltage;
   an applied voltage control unit configured to control the applied voltage, applied to the variable-transmittance ND filter;
   a diaphragm control unit configured to control illuminance through a diaphragm; and
   an operation detection unit configured to detect a push operation associated with the action control device, wherein the push operation corresponds to an instruction for imaging preparation or imaging,
   wherein in an event of the detection of the push operation in a state of monitoring, the action control device switches from the state of monitoring to a state of imaging preparation or to a state of imaging,
   wherein, in the state of monitoring, prior to the detection of the push operation, the illuminance is controlled such that the applied voltage control unit applies a minimum applied voltage, corresponding to an inactive state of the variable-transmittance ND filter, to the variable-transmittance ND filter, and the diaphragm control unit opens or closes the diaphragm, and
   wherein, in the state of imaging preparation or in the state of imaging, subsequent to the detection of the push operation, the illuminance is controlled such that the applied voltage control unit applies a certain applied voltage to the variable-transmittance ND filter, which is in the inactive state, to control the transmittance based on the certain applied voltage, and the diaphragm control unit performs control such that the diaphragm enters a fully opened state.

2. The action control device according to claim 1, further comprising:
   an imaging unit configured to image an image through the variable-transmittance ND filter;
   a transmittance calculating unit configured to calculate the transmittance of the variable-transmittance ND filter based on illuminance of the image imaged by the imaging unit; and
   an applied voltage storage unit configured to store an applied voltage corresponding to transmittance of the variable-transmittance ND filter,
   wherein, at the time of imaging preparation or at the time of imaging, the applied voltage control unit performs control such that, among applied voltages stored in the applied voltage storage unit, an applied voltage corresponding to the transmittance calculated by the transmittance calculating unit is applied to the variable-transmittance ND filter.

3. The action control device according to claim 1, wherein the variable-transmittance ND filter is a liquid crystal ND filter.

4. The action control device according to claim 1, wherein the transmittance of the variable-transmittance ND filter increases or decreases as the applied voltage increases.

5. An action control method of an action control device including a variable-transmittance neutral density (ND) filter having transmittance that varies according to an applied voltage, the method comprising:
   performing an applied voltage control process of controlling the applied voltage, applied to the variable-transmittance ND filter;
   performing a diaphragm control process of controlling illuminance through a diaphragm; and performing an operation detection process of detecting a push operation associated with the action control device, wherein the push operation corresponds to an instruction for imaging preparation or imaging, wherein in an event of the detection of the push operation in a state of monitoring, a switch process of switching the action control device from the state of monitoring to a state of imaging preparation or to a state of imaging is performed, wherein, in the state of monitoring, prior to the detection of the push operation, the illuminance is controlled such that a minimum applied voltage, corresponding to an inactive state of the variable-transmittance ND filter, is applied to the variable-transmittance ND filter in the applied voltage control process, and the diaphragm is opened or closed in the diaphragm control process, and wherein, in the state of imaging preparation or in the state of imaging, subsequent to the detection of the push operation, the illuminance is controlled such that a certain applied voltage is applied to the variable-transmittance ND filter, which is in the inactive state, and transmittance is controlled based on the certain applied voltage in the applied voltage control process, and the diaphragm is controlled such that the diaphragm enters a fully opened state in the diaphragm control process.

6. A non-transitory computer readable medium having stored thereon, a set of computer-executable instructions, for causing a computer, which controls an action control device including a variable-transmittance neutral density (ND) filter having transmittance that varies according to an applied voltage, to execute steps comprising:

performing an applied voltage control process of controlling the applied voltage, applied to the variable-transmittance ND filter;

performing a diaphragm control process of controlling illuminance through a diaphragm; and performing an operation detection process of detecting a push operation associated with an action control device, wherein the push operation corresponds to an instruction for imaging preparation or imaging, wherein in an event of the detection of the push operation in a state of monitoring, a switch process of switching the action control device from the state of monitoring to a state of imaging preparation or to a state of imaging is performed, wherein, in the state of monitoring, prior to the detection of the push operation, the illuminance is controlled such that a minimum applied voltage, corresponding to an inactive state of the variable-transmittance ND filter, is applied to the variable-transmittance ND filter in the applied voltage control process, and the diaphragm control is opened or closed in the diaphragm control process, and wherein, in the state of imaging preparation or in the state of imaging, subsequent to the detection of the push operation, the illuminance is controlled such that a certain applied voltage is applied to the variable-transmittance ND filter, which is in the inactive state, and transmittance is controlled based on the certain applied voltage in the applied voltage control process, and the diaphragm is controlled such that the diaphragm enters a fully opened state in the diaphragm control process.

7. An imaging device, comprising:

a variable-transmittance neutral density (ND) filter configured to have transmittance that varies according to an applied voltage;

an applied voltage control unit configured to control the applied voltage, applied to the variable-transmittance ND filter;

a diaphragm control unit configured to control illuminance through a diaphragm; and an operation detection unit configured to detect a push operation associated with the imaging device, wherein the push operation corresponds to an instruction for imaging preparation or imaging, wherein in an event of the detection of the push operation in a state of monitoring, the imaging device switches from the state of monitoring to a state of imaging preparation or to a state of imaging, wherein, in the state of monitoring, prior to the detection of the push operation, the illuminance is controlled such that the applied voltage control unit applies a minimum applied voltage, corresponding to an inactive state of the variable-transmittance ND filter, to the variable-transmittance ND filter, and the diaphragm control unit opens or closes the diaphragm, and wherein, in the state of imaging preparation or in the state of imaging, subsequent to the detection of the push operation, the illuminance is controlled such that the applied voltage control unit applies a certain applied voltage to the variable-transmittance ND filter, which is in the inactive state, to control transmittance based on the certain applied voltage, and the diaphragm control unit performs control such that the diaphragm enters a fully opened state.

* * * * *